United States Patent
Nishihara et al.

(10) Patent No.: US 6,933,439 B2
(45) Date of Patent: Aug. 23, 2005

(54) WATERPROOF GROMMET

(75) Inventors: Masahiko Nishihara, Shizuoka (JP); Seiji Ito, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/725,613

(22) Filed: Dec. 3, 2003

(65) Prior Publication Data

US 2004/0107533 A1 Jun. 10, 2004

(30) Foreign Application Priority Data

Dec. 4, 2002 (JP) ............................ 2002-352874

(51) Int. Cl.$^7$ .................................................. H02G 3/04
(52) U.S. Cl. .................. 174/48; 174/68.1; 174/68.3; 174/72 C
(58) Field of Search .................. 174/48, 72 C, 174/68.1, 68.3, 95, 49, 135, 65 G, 65 R; 16/2.1, 2.2; 258/56

(56) References Cited

U.S. PATENT DOCUMENTS

| | | | | |
|---|---|---|---|---|
| 4,795,856 A | * | 1/1989 | Farmer | 174/40 R |
| 5,545,854 A | * | 8/1996 | Ishida | 174/153 G |
| 5,973,271 A | * | 10/1999 | Fujita | 174/152 G |
| 6,495,755 B2 | * | 12/2002 | Burton et al. | 174/65 G |
| 6,797,885 B2 | * | 9/2004 | Magyar et al. | 174/97 |
| 6,806,419 B2 | * | 10/2004 | Destruel et al. | 174/48 |
| 6,844,493 B2 | * | 1/2005 | Strong | 174/48 |

FOREIGN PATENT DOCUMENTS

JP      2001-132871      5/2001

* cited by examiner

*Primary Examiner*—Dhiru R. Patel
(74) *Attorney, Agent, or Firm*—Armstrong, Kratz, Quintos, Hanson & Brooks, LLP (57) ABSTRACT

For preventing clamping an elastic grommet main body at open/close, a waterproof grommet (25) has an elastic grommet main body (2) passing electric wires therethrough and a hold member (30) mounted on an outer surface of an intermediate portion in a lengthwise direction of the grommet main body. The hold member is mountable on a mounting part. The grommet main body (26) has a cylindrical portion (4) and bellows portions (2), (3) at the both side thereof. The hold member (30) is provided on the cylindrical portion. The hold member 30 includes a ring portion (14) and a holding portion (15) provided at the ring portion 14. The ring portion (14) is lockable and capable of being opened and closed.

9 Claims, 6 Drawing Sheets

WATERPROOF GROMMET

BACKGROUND OF THE INVENTION

1. Field of the Invention

This invention relates to a waterproof grommet prevented from biting a grommet main body when a trunk is opened or closed by means of fixing the elastic grommet main body provided between a car body and the trunk on a hinge with a hold member.

2. Description of the Related Art

In case of connecting electrically a rotating or moving structure such as a door or trunk of a car and the car body, electric wires, an inside of the moving structure and an inside of the car body are waterproofed by providing a rubber tube waterproof grommet between the moving structure and the car body, and passing the electric wires through an inside of the waterproof grommet.

Figure 9:
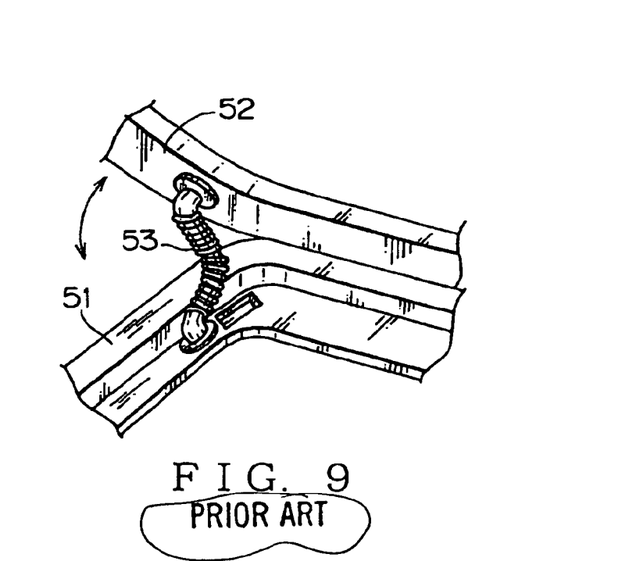
FIG. 9 is a perspective view of an example of a structure on which the waterproof grommet by prior art is mounted.

As shown in FIG. 9, a waterproof grommet 53 is provided between a car body 51 and a back door 52 so as to fit respective end portions of the waterproof grommet 53 into respective openings of the car body 51 and the back door 52. The waterproof grommet 53 is formed into bellows-shape to be improved flexibility by a bellows portion.

Figure 10:
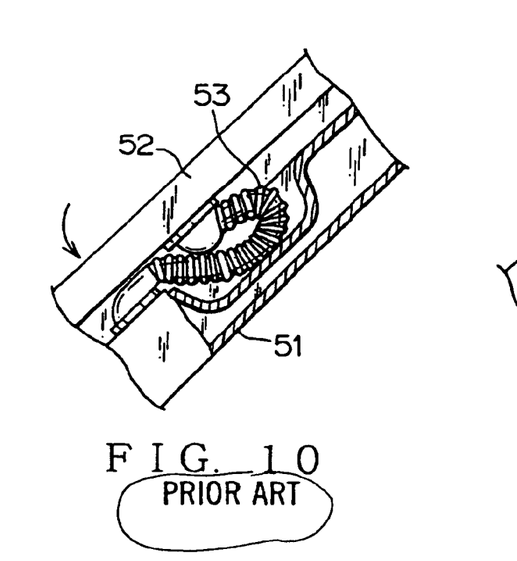
FIG. 10 is a partially-sectional side view of the waterproof grommet by prior art in condition of completely closed the structure.
Figure 11:
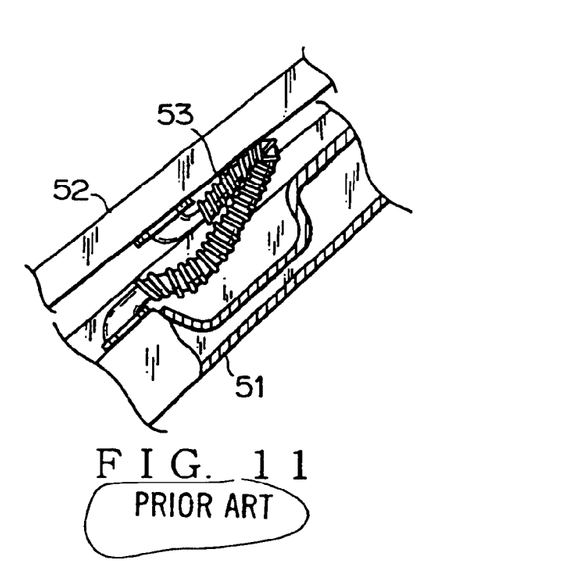
FIG. 11 is a partially-sectional side view of the waterproof grommet by prior art clamped by the structure.

As shown in FIG. 10, the waterproof grommet 53 is generally bent in U-shape when the back door 52 is closed. However, in case of loading torsional force or external force on the waterproof grommet, the waterproof grommet 53 bent outwardly as shown in FIG. 11 may be bitten between the back door 52 and the car body 51.

For overcoming above trouble, a structure in which the waterproof grommet 53 is made difficult to be twisted by means of providing a lib (not shown) integrally with the waterproof grommet 53 along lengthwise thereof is proposed (see Reference 1).

The structure is shown in Page 2 and FIG. 2 of Japan Patent Laid Open 2001-132871 as of Reference 1.

Objects to be Solved

When large torsional force or large external force is loaded on the waterproof grommet, the waterproof grommet is bitten between a fixed structure such as the car body and a moving structure such as the door or trunk, so that the waterproof grommet may be broken or electric wires therein may snap.

To overcome the above drawback, one object of this invention is to provide a waterproof grommet which can be prevented from biting between the fixed structure and the moving structure when large torsional or external force is loaded thereon. The other object of this invention is to provide the aforesaid waterproof grommet which can be installed easily and securely by easy operation and can be manufactured in low cost.

SUMMARY OF THE INVENTION

How to Attain the Object

In order to attain the objects, a waterproof grommet according to this invention, has an elastic grommet main body passing an electric wire therethrough and a hold member being disposed on an outer surface of the grommet main body at an intermediate portion in a lengthwise direction of the grommet main body. The hold member is mountable on a mounting part.

According to above structure, the both ends of a grommet main body are fixed respectively on the fixed structure such as a car body and on the moving structure such as a trunk, and the hold member is mountable on the fixed structure or on a member between the fixed structure and the moving structure. Thereby, when the moving structure moves or rotates, the intermediate portion in a lengthwise direction of the grommet main body is fixed through the hold member so that the grommet main body can be prevented securely from biting at totally closed condition of the moving structure.

The waterproof grommet is more specified in the waterproof grommet mentioned above that the grommet main body has a cylindrical portion and bellows portions at the both side thereof, and the hold member is disposed on the cylindrical portion.

According to above structure, the hold member can be easily disposed on an outer surface of the straight cylindrical portion not bellows portion, and a diameter of the cylindrical portion is smaller than that of the bellows portion. Thereby, a mounting structure of the hold member can be made slim and miniaturized. Operators may not mistake a disposing position for the hold member by the straight cylindrical portion so that the hold member can be disposed securely. The cylindrical portion is reinforced with the hold member so that, if the wall of the cylindrical portion is thin, the cylindrical portion is protected safely from interference with outside.

The waterproof grommet is furthermore specified in the waterproof grommet mentioned above that the hold member includes a ring portion and a hold portion provided at the ring portion. The ring portion is capable to be opened and closed and capable to be locked.

According to above structure, by opening and disposing the ring portion along an outer surface of the grommet main body, and closing and locking the ring portion with itself, the hold member can be easily mounted. The hold member is mountable on the mounting part.

The waterproof grommet is furthermore specified in the waterproof grommet mentioned above that the hold portion has a pair of hook portions for holding a hinge link.

According to above structure, the hinge link is held or clamped between the pair of hook portions. The hinge link is disposed so as to connect the fixed structure and the moving structure. If the pair of hook portions is slidable along the hinge link, twisting the grommet main body at the time of opening or closing the moving structure is relaxed so that a stress on the grommet is reduced.

The waterproof grommet is furthermore specified in the waterproof grommet mentioned above that the hold member is a rigid member.

According to above structure, the intermediate portion of the grommet main body is reinforced with the rigid hold member so that the intermediate portion of the grommet main body is protected safely from interference with outside. The intermediate portion of the grommet main body is held with the hold member so as not to be bent so that the intermediate portion is prevented from breakage by bending.

The waterproof grommet is furthermore specified in the waterproof grommet mentioned above that the cylindrical portion is continued to the bellows portion through a peripheral flange.

According to above structure, the hold member is mounted between a pair of the peripheral flanges so that the peripheral flanges perform as stoppers against the hold member so as to prevent the hold member from moving along lengthwise of the grommet. Additionally, the peripheral flanges reinforce a boundary portion between the cylindrical portion and the bellows portion so that breaking strength of the grommet main body is increased.

The waterproof grommet is furthermore specified in the waterproof grommet mentioned above that the cylindrical portion has a projecting portion, and the ring portion has an engaging portion corresponding to the projecting portion.

According to above structure, the projecting portion performs as a positioning portion against the hold member. The projecting portion is inserted into the engaging portion and engaged therewith so as to prevent the hold member from moving around the grommet main body and along lengthwise of the grommet.

The waterproof grommet is furthermore specified in the waterproof grommet mentioned above that a pair of the projecting portions is oppositely disposed, and right-and-left side marks are provided respectively on the pair of projecting portions or in a vicinity of the pair of projecting portions, and a direction mark for pointing one of the right-and-left side marks is provided on the ring portion.

According to above structure, the hold member is mounted on the grommet main body so as to make the direction mark point one of the right-and-left side marks of the grommet main body designed for a required direction of right or left. An operator can check the waterproof grommet for right or left side by viewing the right-and-left side mark pointed by the direction mark when the operator mounts the waterproof grommet on a car (the fixed structure and the moving structure). The hold member can be used commonly for right and left sides.

The waterproof grommet is furthermore specified in the waterproof grommet mentioned above that a plurality of projections for preventing crushing and checking position is disposed together with the projecting portions on a same straight line at the bellows portion.

According to above structure, the operator can align the engaging portion at the same direction of the projections by viewing the plurality of the projections so that the hold member can be mounted easily and securely on a required position of the grommet main body with no mistake of assembling. Additionally, the bellows portion is prevented from crushing by the plurality of projections, and the bending strength and the life of the bellows portion are increased.

The above and other objects and features of this invention will become more apparent from the following description taken in conjunction with the accompanying drawings.

DESCRIPTION OF THE PREFERRED EMBODIMENT

Figure 1:
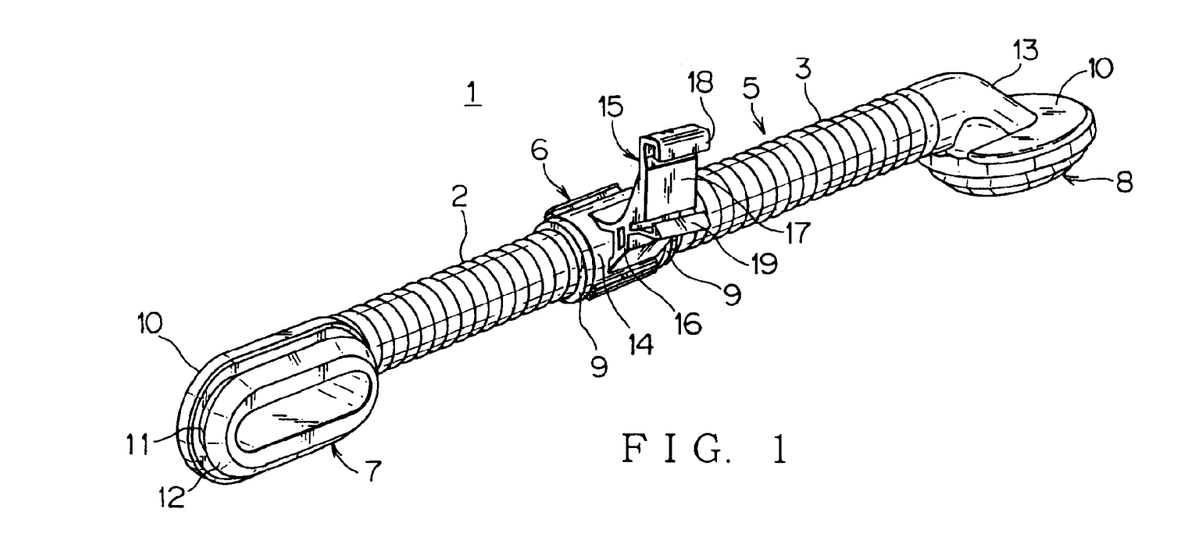
FIG. 1 is a perspective view of the first embodiment of the waterproof grommet according to this invention.
Figure 2:
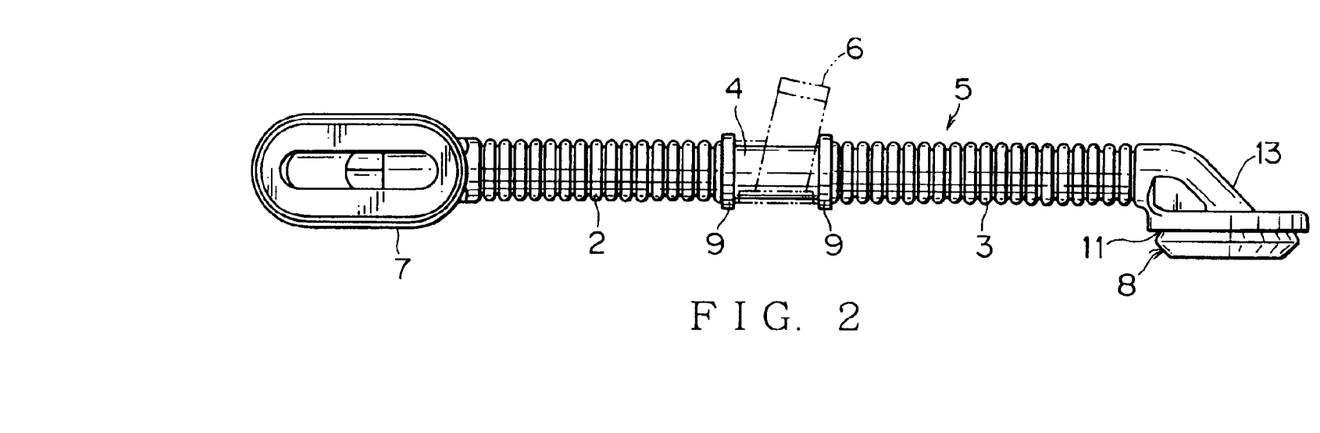
FIG. 2 is a plan view of the grommet main body of the waterproof grommet in FIG. 1.

A first embodiment of a waterproof grommet according to this invention is shown in FIGS. 1 and 2.

The waterproof grommet 1 includes a flexible grommet main body 5 made of synthetic rubber having bellows portions 2, 3 at right-and-left sides and a cylindrical portion 4 (FIG. 2) with a straight outer surface between the bellows portions 2, 3, and a rigid protector 6 (hold member) made of synthetic resin mounted on the outer surface of the cylindrical portion 4 at an intermediate portion in a lengthwise direction of the grommet main body 5.

The grommet main body 5 is formed integrally with the bellows portions 2, 3 along lengthwise thereof, fixing portions 7, 8 with large diameter continuous to one ends of the bellows portions 2, 3, and the cylindrical portion 4 connecting the other ends of the bellows portions 2, 3 with each other. The cylindrical portion 4 is formed to have a smaller diameter than an outer diameter of the bellows portions 2, 3 and to have a substantially same diameter as a root diameter of the bellows portions 2, 3. Peripheral flanges 9 for stoppers are formed integrally between the cylindrical portion 4 and the bellows portions 2, 3.

It is not limited that the cylindrical portion 4 is placed in the center of the grommet main body 5. The cylindrical portion 4 may be placed at required position in the intermediate portion of the grommet main body correspondingly to condition in use. The intermediate portion means an intermediate area in a lengthwise direction of the grommet main body 5.

The bellows portions 2, 3 have holes inside thereof for inserting electric wires. The fixing portions 7, 8 are fixed in holes of panels of a car body, a door or a trunk. The fixing portions 7, 8 have slant-shape tube portions 13 continuous to the bellows portions 2, 3., oval-shape flange portions 10 continuous to the tube portions 13, and oval-ring shape projecting parts 12 projecting through ring round grooves 11 from the flange portions 10. An edge portion of the hole of the panel of the car body or the door is fitted into the round groove 11. The fixed portions 7, 8 are not limited to be oval, and they may be circular.

The cylindrical portion 4 at the intermediate portion can be formed with synthetic resin as a separated part so as to join right-and-left bellows portions 2, 3 with the separated cylindrical part (not shown). Round grooves are provided inside of peripheral flanges 9 at ends of the bellows portions 2, 3 and flange portions (not shown) at both ends of the cylindrical part are fitted into the round grooves. The cylindrical part can be rotatable independently along circumference of the grommet main body. In this case, a gap which water goes through is not allowed between the cylindrical part and the grommet main body.

The protector 6 has a ring portion 14 to contact with an outer surface of the cylindrical portion 4 at intermediate portion of the grommet main body 5 and a holding portion 15 formed integrally to project from outside of the ring portion 14. The ring portion 14 can be opened and closed around a hinge, and is locked with each other in ring shape by later-described locking means. The ring portion 14 of the protector 6 is placed between the right and left peripheral flanges 9 of the grommet main body 5 so that the ring portion 14 is guided by the peripheral flanges 9 so as not to move right and left.

The holding portion 15 has a projecting portion 16 projecting from the ring portion 14, a plate portion 17 continuous to the projecting portion 16 and a pair of hook portions 18, 19 having respectively U-shape cross-section and L-shape cross-section at both sides of the plate portion 17. The hook portions 18, 19 have grooves respectively at inside thereof. Shape of the holding portion 15 can be designed correspondingly to a mounting side.

Figure 3:
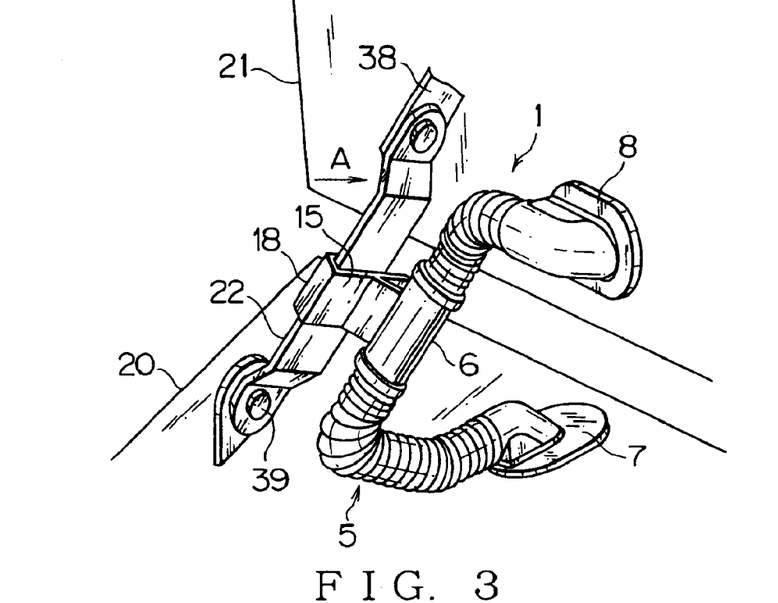
FIG. 3 is a perspective view of an example of a structure on which the waterproof grommet is mounted.

FIG. 3 shows an example of a structure that the waterproof grommet 1 is mounted in.

The waterproof grommet 1 is placed between a fixed structure 20 such as a car body and a moving (rotating) structure 21 such as a back door or a trunk. The fixed portion 7 at one end of the grommet main body 5 is fitted in the hole of panel of the fixed structure 20, and the fixed portion 8 is fitted in the hole of panel of the moving structure 21. The intermediate portion in a lengthwise direction of the grommet main body 5 is fixed through the protector 6 by engaging with a plate hinge link 22 (a mounting part) connecting the fixed structure 20 and the moving structure 21. The pair of hook portions 18, 19 of the hold portion 15 hold the both sides in widthwise of the hinge link 22 by engaging the both sides in widthwise of the hinge link 22 with the grooves at inside of the hook portions 18, 19.

One end of the hinge link 22 is joined with the fixed structure 20 and the other end of the hinge link 22 is joined with a bracket 28 of a gas-stay (not shown) by means of a rivet 39. In FIG. 3, the hinge link 22 is disposed oblique-upwardly in full-open condition of the moving structure 21. The hinge link 22 is rotated clockwise downwardly with a relatively small angle in a direction of an arrow A in FIG. 3 when the moving structure is closed completely. The other end of the hinge link 22 can be joined directly with the moving structure so as to be rotated counterclockwise. In this case, the waterproof grommet may be twisted larger. The hinge link 22 can be designed freely as a part disposed between the fixed structure 20 and the moving structure 21.

The grommet main body 5 is bent in U-shape when viewed from top in full-opened and complete closed conditions of the moving structure 21. The waterproof grommet 1 is loaded with large twisting force correspondingly to opening and closing the moving structure 21. However, the intermediate portion of the grommet main body 5 is held on the hinge link 22 by the protector 6 so that the waterproof grommet 1 has no chance to be clamped between the moving structure 21 and the fixed structure 20.

The intermediate portion of the grommet main body 5 is protected safely by the rigid protector 6 from interference with outside. The cylindrical portion 4 covered by the protector 6 is maintained straight without bending when the moving structure 21 is rotated. Thereby, the cylindrical portion 4 is prevented from damage with time (such as breakage by bending).

Structure of the holding portion 15 is not limited in above structure. When the protector 5 is not required to slide, a lock clip (not shown) formed on the holding portion may be fitted into a hole (not shown) provided in the hinge link 22. The holding portion 15 can be held or locked on a panel of the fixed structure 20 or the moving structure 21.

Figure 4:
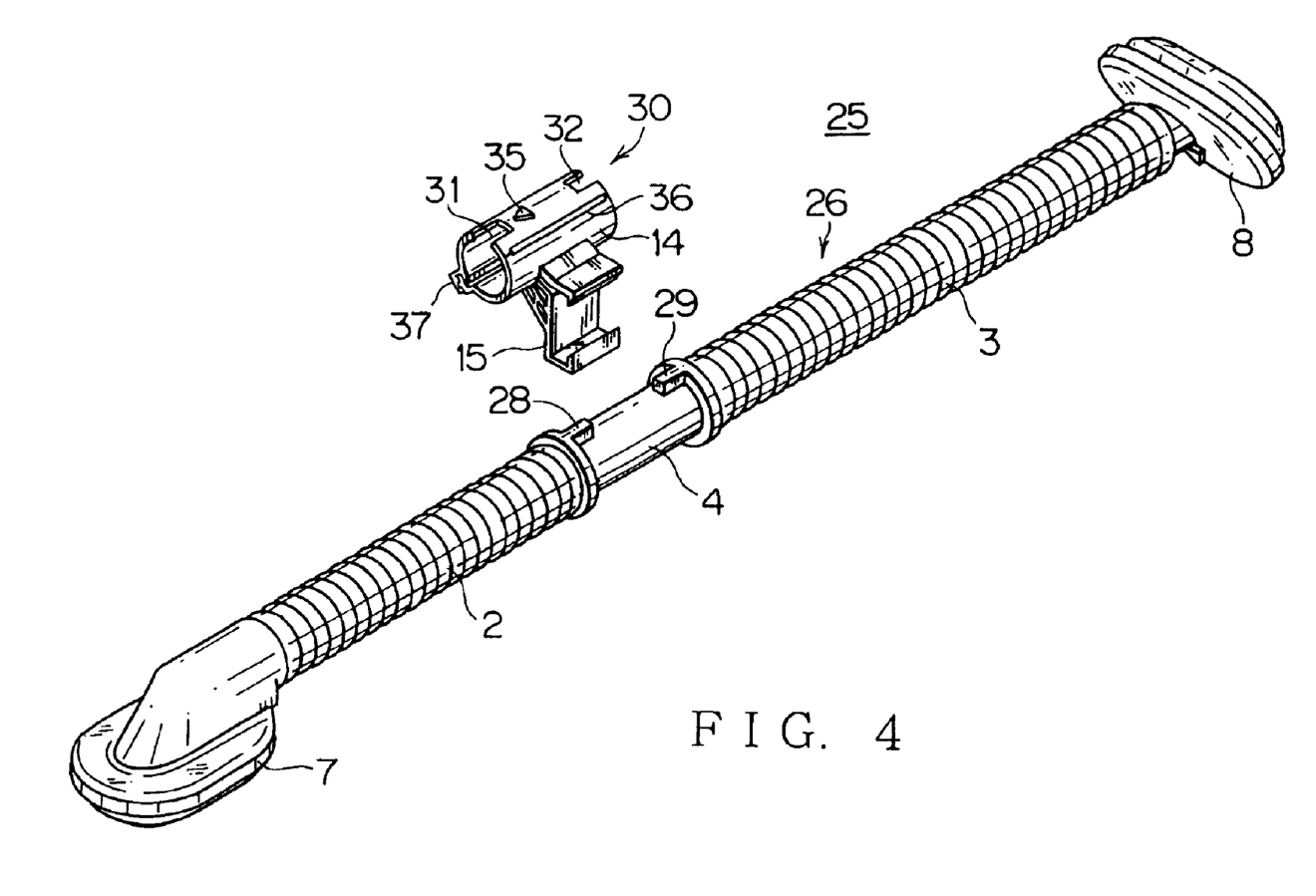
FIG. 4 is an exploded perspective view of the second embodiment of the waterproof grommet according to this invention.
Figures 5, 8:
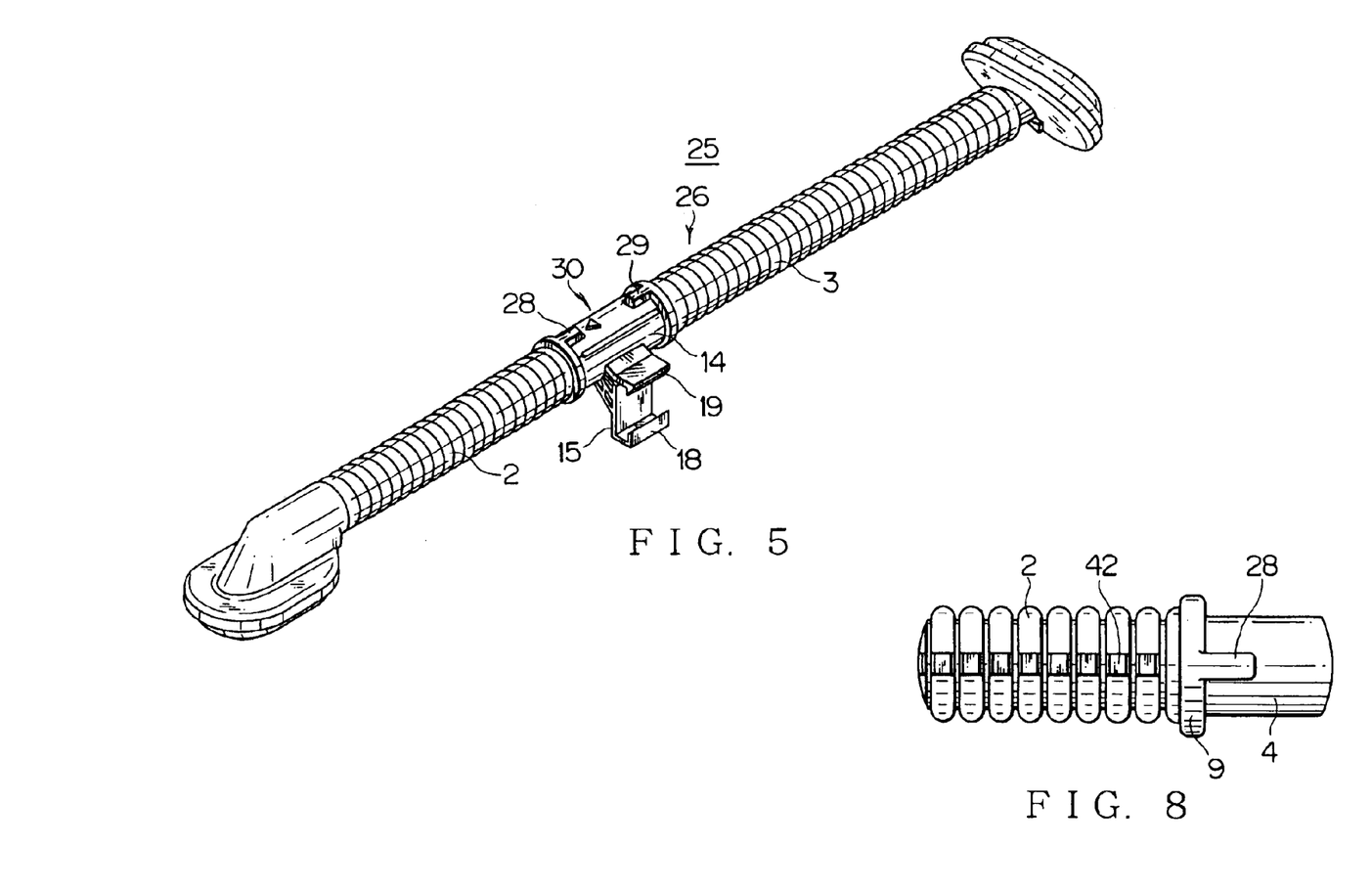
FIG. 5 is a perspective view of the waterproof grommet in FIG. 4.
FIG. 8 is a plan view, showing important area of the grommet main body in FIG. 7.
Figure 6A:
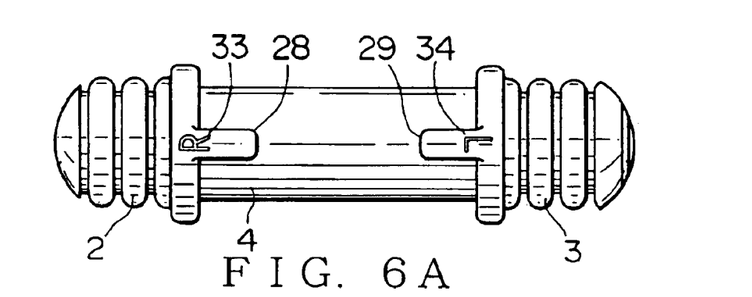
FIG. 6A is a plan view, showing the intermediate portion area of the grommet main body.
Figure 6B:
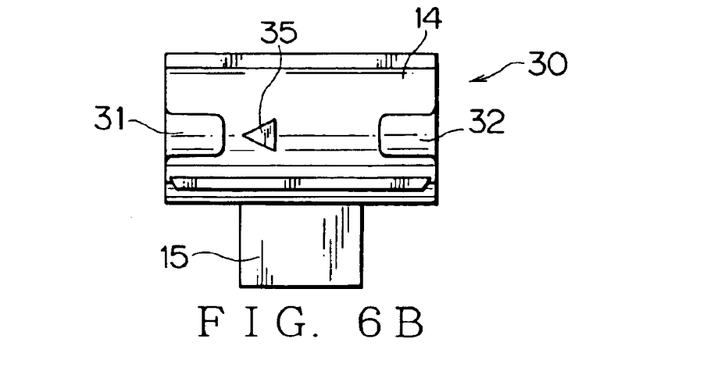
FIG. 6B is a plan view, showing the important area of the hold member.

The second embodiment of the waterproof grommet according to this invention is shown in FIGS. 4–6. The same components as the aforesaid first embodiment are put with the same marks, and detailed explanation for them is omitted.

The waterproof grommet 25 has a pair of projecting portions 28, 29 formed integrally on the outer surface of the cylindrical portion 4 at an intermediate portion of an elastic grommet main body 26 so as to be disposed symmetrically and oppositely at right and left sides of the cylindrical portion 4 and cutout concave portions 31, 32 (engaging portions) for engaging with the projecting portions 28, 29 provided at a synthetic resin protector 30 additionally to the first embodiment. Furthermore, "R" letter 33 (right-and-left side marks) meaning right side is disposed on one projecting portion 28 or in the vicinity of the one projecting portion 28, and "L" letter 34 (right-and-left side marks) meaning left side is disposed on the other projecting portion or in the vicinity of the other projecting portion, as shown in FIG. 6A. Furthermore, a triangular direction mark 35 is disposed in the vicinity of one of the cutout concave portions 31 as shown in FIG. 6B. Thereby, the protector can be used both for right side and left side, and prevented from mistake of assembling.

The moving structure 21 (FIG. 3) such as a back door and a trunk has two types for right-hand and left-hand drive cars in which the waterproof grommets 25 are disposed oppositely in the right-hand and left-hand drive cars. The grommet main body 25 is straight and right-left symmetrical so that the grommet main body can be used both for right-hand and left-hand drive cars. The protector 30 is right-left asymmetrical so that the protector 30 used in common may be assembled in error. For example, a right-side waterproof grommet assembled oppositely in right and left with the protector cannot be mounted on the hinge link 22 (FIG. 3). The waterproof grommet can be used for left side, but the operator cannot recognize easily whether the waterproof grommet is for right or for left.

The protector 30 can be mounted on the grommet main body 26 so as to make the direction mark 35 point to the "R" letter 33 of the grommet main body 26 for the right waterproof grommet 25. And the protector 30 can be mounted on the grommet main body 26 so as to make the direction mark 35 point to the "L" letter 34 of the grommet main body 26 for the left waterproof grommet 25. Thereby, the operator can recognize easily and securely whether the waterproof grommet is for right or left by viewing the letter ("R" or "L") pointed by the direction mark 35. The right-and-left side marks 33, 34 project (expose) outwardly from the cutout concave portions 31, 32, so that the side marks can be seen easily.

The projecting portions 28, 29 of the grommet main body 26 can perform as positioning portions for the protector 30. By engaging the projecting portions 28, 29 with the cutout concave portions 31, 32, the protector 30 can be positioned securely against the grommet main body 26 so that operating efficiency of assembling the waterproof grommet 25 is enhanced.

The protector 30 is mounted on the grommet main body 26 in the condition of opening the ring portion 14 of the protector 30. A thin-wall hinge portion 36 is formed in the ring portion 14 straightly along an axis of the ring portion 14. The ring portion 14 has a divided portion at an opposite position against the hinge portion 36. One end of the divided portion has a locking hook or a locking projection on an outer surface thereof and the other end of the divided portion has engaging means 37 such as an engaging hook, an engaging concave portion or an engaging frame on an outer surface thereof. In a condition of unlocking the engaging means 37, the protector 30 is mounted and the engaging means is locked to prevent the protector 30 from slipping out of the grommet main body 26.

The projecting portions 28, 29 and the cutout concave portions 31, 32 is not limited to be rectangular and may be cylindrical, circular, triangular or trapezoidal. The direction mark 35 may be arrow-like not triangular as capable to be recognized by the operator.

Figure 7:
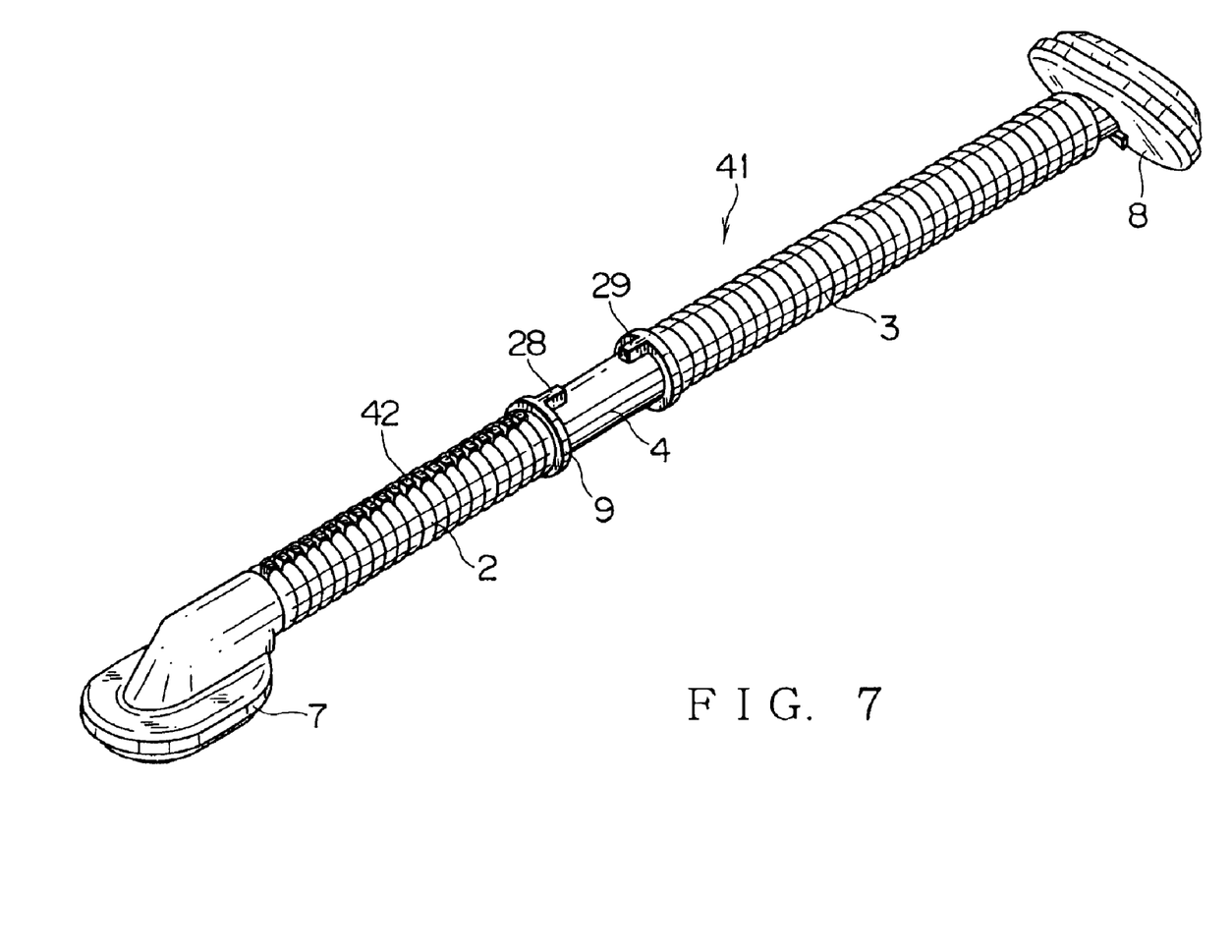
FIG. 7 is a perspective view of the grommet main body of the third embodiment of the waterproof grommet according to this invention.

The third embodiment of the waterproof grommet according to this invention is shown in FIGS. 7–8. The same components as the aforesaid first embodiment are put with the same marks, and detailed explanation for them is omitted.

The waterproof grommet is specified, in the aforesaid second embodiment added the projecting portions 28, 29 for positioning, by that projections 42 for preventing crushing and checking position is disposed on a straight line on an outer surface of the bellows portion 2 of the grommet main body 4. The projecting portions 28, 29 and the projections 42 are disposed on the straight line. The waterproof grommet includes a grommet main body 41 and a protector 30 shown in FIG. 4.

The projections 42 for preventing crushing and checking position was proposed in Japan Patent Application Laid Open H9-292061 by the same applicant. The projections 42 are formed on each crest of peaks of the bellows portion 2 slightly narrow than a width of the crest so as to be disposed adjacently in a lengthwise direction of the grommet main body.

In this embodiment, the projections 42 for preventing crushing and checking position are provided only on one side of the bellows portion 2 ("R" marked side in FIG. 6) so that recognizing "R" or "L" is made easier. The projections 42 for preventing crushing and checking position are formed into spiral by twisting so that the operator can recognize twisting condition easily.

The projections 42 for preventing crushing and checking position have substantially same width as the projecting portion 28 for positioning and about half length of the projecting portion 28 for positioning, as shown in FIG. 8. The projecting portion 28 for positioning extends perpendicularly to the peripheral flange 9 at the end of the cylindrical portion 4.

The protector 30 (FIG. 4) can be positioned and assembled on the grommet main body 41 easily by viewing the projections 42 for preventing crushing and checking position. "R", "L" right-and-left side marks of the grommet main body 26 and the triangular direction mark 35 of the protector 30 in the second embodiment can be applied effectively to the third embodiment.

In each aforesaid embodiment, the protector 6, 30 is mounted on the straight cylindrical portion 4. A protector having convexo-concave portion engaging root portions of the bellows portions 2, 3 can be mounted on an outer surface of the bellows portions 2, 3 instead of the cylindrical portion 4. The protector 6 can be formed as a separated part from the grommet main body 5 with synthetic rubber instead of synthetic resin. The protector 6 can be also formed integrally with the grommet main body 5 with synthetic rubber. Furthermore, the protector 6 made of synthetic resin can be fixed on the flexible grommet main body 5 by insert molding or outsert molding. The grommet main body 5 having no bellows portions 2, 3 can be applied.

Although the present invention has been fully described by way of examples with reference to the accompanying drawings, it is to be noted that various change and modifications can be made with the scope of the present invention.

What is claimed is:

1. A waterproof grommet comprising:

an elastic grommet main body, having a bellows portion, passing an electric wire therethrough and two opposed ends, a first end arranged to be fixed to a fixed structure and a second end arranged to be fixed to a movable structure; and a hold member being disposed on an outer surface of said grommet main body at an intermediate portion in a lengthwise direction of said grommet main body, whereby said hold member is mountable on a mounting part.

2. A waterproof grommet comprising:

an elastic grommet main body passing an electric wire therethrough;

a hold member being disposed on an outer surface of said grommet main body at an intermediate portion in a lengthwise direction of said grommet main body, whereby said hold member is mountable on a mounting part;

wherein said grommet main body has a cylindrical portion and bellows portions at the both side thereof, and wherein said hold member is disposed on said cylindrical portion.

3. The waterproof grommet according to claim 2, wherein said hold member comprises a ring portion and a hold portion provided at said ring portion, said ring portion capable of being opened and closed and capable of being locked.

4. The waterproof grommet according to claim 3, wherein said hold portion comprises a pair of hook portions for holding a hinge link.

5. The waterproof grommet according to claim 4, wherein said hold member is a rigid member.

6. The waterproof grommet according to claim 5, wherein said cylindrical portion is continued to said bellows portion through a peripheral flange.

7. The waterproof grommet according to claim 3, wherein said cylindrical portion is provided with a projecting portion, and said ring portion is provided with an engaging portion corresponding to said projecting portion.

8. The waterproof grommet according to claim 7, wherein said cylindrical portion is provided with a pair of projecting portions, one of said pair being at each end of said cylindrical portion, and right-and-left side marks are provided respectively on said pair of projecting portions or in a vicinity of said pair of projecting portions, and a direction mark for pointing one of said right-and-left side marks is provided on said ring portion.

9. The waterproof grommet according to claim 8, wherein a plurality of projections for preventing crushing and checking position is disposed together with said projecting portions on a same straight line at said bellows portion.

* * * * *